United States Patent
Dolek et al.

(10) Patent No.: US 12,508,783 B2
(45) Date of Patent: Dec. 30, 2025

(54) COMPOSITE PRODUCTION SYSTEM

(71) Applicant: TUSAS—TURK HAVACILIK VE UZAY SANAYII ANONIM SIRKETI, Kahramankazan/Ankara (AR)

(72) Inventors: Turker Dolek, Kahramankazan/Ankara (AR); Dogancan Eraslan, Kahramankazan/Ankara (AR)

(73) Assignee: TUSAS—TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 147 days.

(21) Appl. No.: 18/580,028

(22) PCT Filed: Jun. 22, 2022

(86) PCT No.: PCT/TR2022/050629
§ 371 (c)(1),
(2) Date: Jan. 17, 2024

(87) PCT Pub. No.: WO2023/009087
PCT Pub. Date: Feb. 2, 2023

(65) Prior Publication Data
US 2024/0375360 A1    Nov. 14, 2024

(30) Foreign Application Priority Data
Jul. 30, 2021   (TR) .......................... TR2021/012137

(51) Int. Cl.
*B29C 70/44*    (2006.01)
*B29C 70/54*    (2006.01)

(52) U.S. Cl.
CPC ............ *B29C 70/44* (2013.01); *B29C 70/544* (2021.05)

(58) Field of Classification Search
CPC ..... B29C 70/44; B29C 70/443; B29C 70/446; B29C 70/543; B29C 70/544
See application file for complete search history.

(56) References Cited

U.S. PATENT DOCUMENTS 7,147,818 B1 * 12/2006 Rigas .................... B29C 70/443
264/102
10,933,595 B2 * 3/2021 Matsumoto ............... B64C 3/26
(Continued)

FOREIGN PATENT DOCUMENTS

AU    2006265783 A1    1/2007
AU    2006265783 B2    1/2007
(Continued)

OTHER PUBLICATIONS

International Search Report and Written Opinion for PCT application No. PCT/TR2022/050629, mailed Jun. 1, 2023.
(Continued)

*Primary Examiner* — Andrew L Swanson
(74) *Attorney, Agent, or Firm* — Notaro, Michalos & Zaccaria P.C.

(57) ABSTRACT

A composite product system has a mold, a plurality of fabrics laid on the mold, and at least one vacuum bag placed on the mold so as to substantially cover the fabrics and allow vacuuming. At least one bleeder is located between the mold and/or the fabrics. A separator layer located between the vacuum bag and the fabric enables excess resin in the fabric to be substantially absorbed by the bleeder to provide homogeneous pressure distribution. A main vacuum line located on the vacuum bag allows evacuation of the air and/or the resin in the fabric and the air between the vacuum bag and the mold. A first vacuum pump connected to the main vacuum line generates the pressure required to evacuate the air. At least one discharge line is located on the (Continued)

vacuum bag with at least one end thereof connected to the main vacuum line.

12 Claims, 2 Drawing Sheets

(56) References Cited

U.S. PATENT DOCUMENTS

| | | | | |
|---|---|---|---|---|
| 12,064,928 | B2* | 8/2024 | Hunt | B29B 11/16 |
| 2008/0314497 | A1* | 12/2008 | Pettersen | B29C 70/44 |
| | | | | 156/382 |
| 2014/0001682 | A1* | 1/2014 | Schneiderbauer | B29C 70/443 |
| | | | | 264/571 |
| 2018/0339413 | A1* | 11/2018 | Halbritter | B32B 37/1018 |
| 2020/0061937 | A1* | 2/2020 | Matsumoto | B32B 15/14 |

FOREIGN PATENT DOCUMENTS

| | | |
|---|---|---|
| CN | 113002013 A | 6/2021 |
| EP | 3539764 A1 | 9/2019 |
| WO | 2013153537 A2 | 10/2013 |

OTHER PUBLICATIONS

International Preliminary Report on Patentability, completed on Sep. 11, 2023.
International Application Status Report—generated Jan. 5, 2024.

\* cited by examiner

COMPOSITE PRODUCTION SYSTEM

FIELD

The present invention relates to a production system in which composite material production is carried out.

BACKGROUND

Vacuum bagging method used in the production of composite materials eliminates the disadvantages of the classically applied manual lay-up methods and provides the production of stronger and lighter composite structures. The vacuum bagging method enables both shaping of the composite part and production of parts with better strength. Temperature and pressure values are important parameters in the production of composite parts. Temperature values increase the curing period of the resin and thus the transition period of the composite material to the soft state. Another important parameter in the production of composite parts is compression. Upon compression, the air between the composite fabric and the resin is enabled to be evacuated, so that a layered composite part free from air bubbles can be produced. Compression enables the resin to penetrate into all layers. Moreover, air bubbles inside the composite layers can be minimized, thereby reducing the formation of cracks.

United States patent document U.S. Pat. No. 8,215,360, which is included in the known-state of the art, discloses production process of composite panels by vacuum bagging method. There is disclosed a vacuum source for vacuuming composite parts and a reproducer that allows the vacuum from this source to be used on different operational elements. By using the reproducer, a plurality of parts can be vacuumed simultaneously.

United States patent document US2018339413, which is included in the known-state of the art, discloses production of composite parts with complex geometry by vacuum bagging technique. By vacuuming the vacuum bags with different vacuuming apparatuses, a vacuum environment is created for the production of different structures.

Another patent document no. AU2006265783A1 discloses a production system for producing a composite component is disclosed. Said system comprises a mould assembly having a relatively rigid mould section, an elastically deformable mould section, fluid pressure means for applying a fluid pressure due to a density and/or pressure of a fluid on said elastically deformable mould section, and a resin supply means for supplying resin to a mould chamber defined between the mould sections when brought together.

Another patent document no. WO2013153537A2 discloses a method of manufacturing single piece fuselage barrels in a composite material. In said method, composite material is stiffened by stringers.

Another patent document no. CN113002013A discloses a composite forming method of carbon fiber composite material automobile hub. Said method comprises the steps of, attaching plurality of material sheets into an upper die and a lower die respectively, and performing pre-vacuumizing; filling silica gel into the positions among the plurality of material sheets in the upper die and the lower die, performing buckling to form a die body, and performing pre-pressing; filling the die body into a vacuum bag, and performing vacuumizing; placing the die body wrapped with the vacuum bag, in an autoclave, and forming a hub rough blank through heating, pressurizing, curing and forming; and taking the hub rough blank out of a die to be subjected to post processing to form a hub finished product.

Another patent document no. EP3539764A1 discloses a laminated composite structure having one or more interlaminar corrugations and a method for forming said composite structure. Said method comprises the steps of, forming a laminate assembly comprising at least a first laminate coupled to a second laminate, and one or more gap elements coupled between the first laminate and the second laminate, to form a gap area between the first laminate and the second laminate; using a pressurizing system to consolidate the laminate assembly, and to create a low pressure region in the gap area for forming the one or more interlaminar corrugations; and curing the laminate assembly to form the laminated composite structure having the one or more interlaminar corrugations.

SUMMARY

Thanks to a composite production system according to the present invention, the workload provided by a main vacuum line is reduced by an additional vacuum line, thus increasing performance and energy efficiency in the vacuum bagging technique.

Another object of the present invention is to provide a suitable pre-vacuuming process for each part with an additional vacuum line and to develop a portable vacuum usage, by means of the composite production system.

A further object of the present invention is to provide a simple, easy to use, practical and effective composite production system.

The composite production system realized to achieve the object of the invention, which is defined in the first claim and other claims dependent thereon, comprises fabrics that are laid layer by layer on the mold; a vacuum bag which is spread over the fabrics to cover them, wherein a vacuum environment is created in the vacuum bag; a bleeder which is located between the mold and the fabric and/or between the fabrics and allows the excess resin in the fabric to be absorbed; a release film which is located between the vacuum bag and the fabric and allows the excess resin in the fabric to leak through the holes in the separator layer and be absorbed by the bleeder; a main vacuum line that connects to the vacuum bag to evacuate the air inside the vacuum bag and/or the excess resin and/or air in the fabric; a first vacuum pump which triggers the main vacuum line to provide the pressure necessary for the main vacuum line to evacuate the air; a discharge line located on the vacuum bag, one end of which is connected to the main vacuum line. One end of the discharge line is connected to the main vacuum line and the other end thereof is connected to the vacuum bag. When the vacuum pump triggers the main vacuum line, it evacuates the air in the vacuum bag and operates continuously to simultaneously draw the air from the different parts.

The composite production system according to the invention comprises an auxiliary vacuum line which is connected to the discharge line on at least one end, draws the air from the vacuum bag at a lower pressure and higher flow rate before evacuating the air in the vacuum bag, thus performing a pre-vacuuming process and operating as an additional line without any loss of power to be consumed by the main vacuum line; a second vacuum pump which provides the pressure necessary for the operation of the auxiliary vacuum line; a valve system which allows only one of the main vacuum line and/or auxiliary vacuum line fed by the discharge line to evacuate air from the vacuum bag when a pressure value of the auxiliary vacuum line and/or the main vacuum line reaches a pressure value determined by the user. Initially, the auxiliary vacuum line draws the air in the vacuum bag in a high flow rate, and then, the air flow from the auxiliary vacuum line is cut off through the valve system when the pressure value desired by the user is reached, so that the remaining air and/or resin in the vacuum bag and/or fabric is evacuated by the main vacuum line.

In an embodiment of the invention, the composite production system comprises a sensor which at measures the pressure value provided by the auxiliary vacuum line and/or the main vacuum line in the vacuum bag; a control unit which enables the main vacuum line and/or auxiliary vacuum line to be fed by the discharge line in accordance with a command transmitted to the valve system and depending on the data received from the sensor.

In an embodiment of the invention, the composite production system comprises a chamber through which the main vacuum line passes and which is located on the discharge line; an auxiliary vacuum unit located in the chamber and consisting of the valve system, the auxiliary vacuum line and the second vacuum pump. Therefore, a suitable and practical solution is provided for each part by pre-vacuuming by the portable chamber.

In an embodiment of the invention, the composite production system comprises the valve system with one end connected to the auxiliary vacuum line and the other end to the main vacuum line, wherein the valve system performs a two-stage vacuuming by connecting to the vacuum bag at a single point, wherein the valve system cuts the air fed from the discharge line when the auxiliary vacuum line reaches a certain pressure value, so as to enable the main vacuum line to be activated.

In an embodiment of the invention, the composite production system comprises the auxiliary vacuum line which is connected to the discharge line by means of the valve system in a removable manner, thus providing portable and easy use, and minimizing the workload of the main vacuum line since it is connected from the outside as an additional vacuum line.

In an embodiment of the invention, the composite production system comprises the auxiliary vacuum line triggered by an electric or mechanical motor, which evacuates most of the air in the vacuum bag.

In an embodiment of the invention, the composite production system comprises the valve system having a solenoid or control valve system, which provides air passage between the auxiliary vacuum line and/or the main vacuum line.

In an embodiment of the invention, the composite production system comprises a display providing instantaneous display of pressure values of main vacuum line and/or auxiliary vacuum line by the user. Thus, it enables the user to monitor the pressure value.

In an embodiment of the invention, the composite production system comprises a dry fabric or a fabric impregnated with resin. Resin is added to the dry fabric afterwards, or resinous fabric can be used.

In an embodiment of the invention, the composite production system comprises a protective layer which is sprayed onto the mold or located between the mold and the fabric, which allows the fabric to be easily separated from the mold when heat and/or pressure is applied to the fabric, and prevents the fabric from sticking to the mold.

In an embodiment of the invention, the composite production system comprises the auxiliary vacuum line for which the pressure value is automatically adjusted depending on the size information of the fabric, and which evacuates the air from the vacuum bag based on the determined pressure value.

In an embodiment of the invention, the composite production system comprises the control unit which enables the pressure value required by the first vacuum pump to be maintained at the set value depending on the power consumed by the second vacuum pump.

BRIEF DESCRIPTION OF THE DRAWINGS

The composite production system realized to achieve the object of the present invention is illustrated in the attached drawings, in which.

Figure 1:
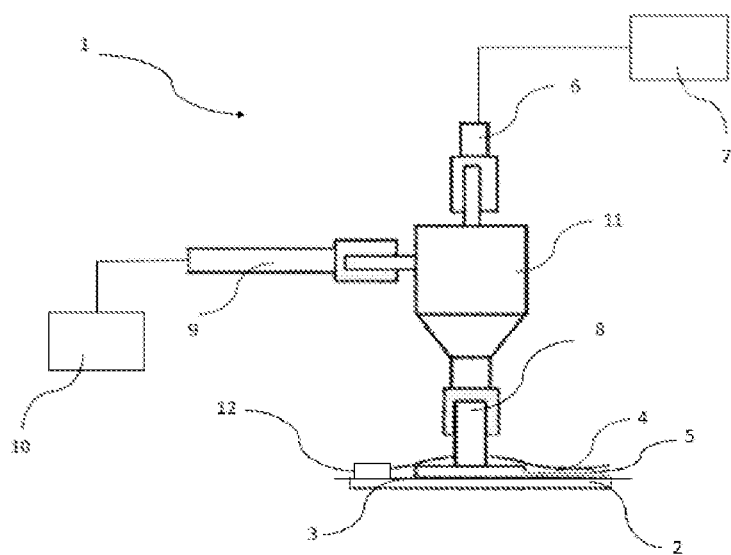
FIG. 1—is a schematic illustration of the composite production system.

All the parts illustrated in figures are individually assigned a reference numeral and the corresponding terms of these numbers are listed below:
1. Composite Production System
2. Mold
3. Fabric
4. Vacuum Bag
5. Separator Layer
6. Main Vacuum Line
7. First Vacuum Pump
8. Discharge Line
9. Auxiliary Vacuum Line
10. Second Vacuum Pump
11. Valve System
12. Sensor
13. Control Unit
14. Chamber
15. Auxiliary Vacuum Unit
16. Display
17. Protective Layer
    (E) Bleeder

DETAILED DESCRIPTION

The composite production system (1) comprises a mold (2); a plurality of fabrics (3) laid on the mold (2); at least one vacuum bag (4) which is placed on the mold (2) so as to substantially cover the fabrics (3) and allows vacuuming; at least one bleeder (E) located between the mold (2) and/or the fabrics (3); at least one separator layer (5) which is located between the vacuum bag (4) and the fabric (3) and enables the excess resin in the fabric (3) to be substantially absorbed by the bleeder (E), thus providing homogeneous pressure distribution; at least one main vacuum line (6) located on the vacuum bag (4), which allows evacuation of the air and/or the resin in the fabric (3) and/or the air between the vacuum bag (4) and the mold (2); a first vacuum pump (7) which is connected to the main vacuum line (6) and generates the pressure required to evacuate the air; at least one discharge line (8) located on the vacuum bag (4), with at least one end thereof connected to the main vacuum line (6).

The composite production system (1) according to the invention comprises at least one auxiliary vacuum line (9) with at least one end thereof connected to the discharge line (8), wherein the auxiliary vacuum line (9) creates a lower pressure than the main vacuum line (6) to substantially evacuate the air contained in the vacuum bag (4), thereby enabling the pre-vacuuming process to be performed; a second vacuum pump (10) connected to the auxiliary vacuum line (9) and providing the necessary pressure to evacuate the air; at least one valve system (11) located on the discharge line (8), which allows only one of the main vacuum line (6) or the auxiliary vacuum line (9) to be fed by the discharge line (8) in order to keep the pressure value of the main vacuum line (6) and/or the auxiliary vacuum line (9) at the pressure value determined by the user.

Figure 2:
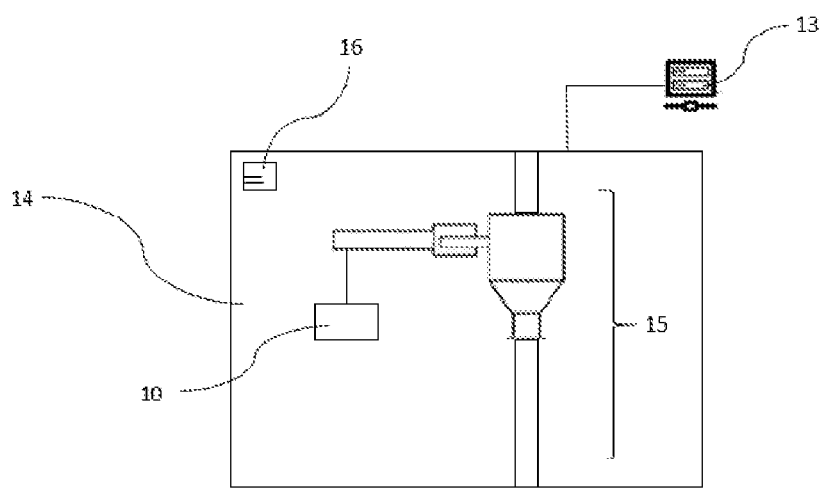
FIG. 2—is a schematic illustration of the auxiliary vacuum unit.

The composite production system (1) comprises a mold (2); a plurality of fabrics (3) located on the mold (2); at least one vacuum bag (4) which is laid on the mold (2) so as to cover the fabrics (3) and in which a vacuum environment is created; at least one bleeder (E) located between the mold (2) and/or the fabrics (3) so as to absorb excessive resin in the fabric (3); at least one separator layer (5) which is located between the vacuum bag (4) and the fabric (3) and enables the excess resin in the fabric (3) to be absorbed by the bleeder (E) by leaking; at least one main vacuum line (6) located on the vacuum bag (4), which allows the air and/or the resin in the fabric (3) and/or the air between the vacuum bag (4) and the mold (2) to be at least partially evacuated; a first vacuum pump (7) which is connected to the main vacuum line (6) and provides the pressure environment required to evacuate the air; at least one discharge line (8) with one end thereof connected to the vacuum bag (4) and the other end thereof connected to the main vacuum line (6). Vacuum bagging technique is applied to evacuate the air bubbles between the fabric (3) and the resin or the air between the mold (2) and the fabrics (3) or between the layers of the fabric (3) and to shape the composite part, wherein the air is evacuated when the main vacuum line (6) triggers the first vacuum pump (7). Excess resin in the fabric (3) is removed from the fabric (3) by using the separator layer (5) and the bleeder (E). The main vacuum line (6) fed from the discharge line (8) is in continuous operation to vacuum different composite parts (FIG. 1, FIG. 2).

The composite production system (1) comprises at least one auxiliary vacuum line (9) located on the vacuum bag (4), which provides pre-vacuuming by substantially evacuating the air contained in the vacuum bag (4) before the main vacuum line (6) is activated to evacuate the air inside the vacuum bag (4) of the fabric (3), wherein the auxiliary vacuum line (9) operates with a lower pressure at higher flow rate; at least a second vacuum pump (10) which is connected to the auxiliary vacuum line (9), provides the necessary pressure environment to evacuate the air, and triggers the auxiliary vacuum line (9); at least one valve system (11) located on the discharge line (8), which allows the main vacuum line (6) and/or the auxiliary vacuum line (9) fed by the discharge line (8) to operate in a synchronized manner by closing one of them when the other is in operation, in order to keep the pressure value of the main vacuum line (6) and/or the auxiliary vacuum line (9) at the pressure value determined by the user. While the main vacuum line (6) is in operation for the other fabric (3) pieces, the auxiliary vacuum line (9) performs vacuuming for said fabrics (3). The auxiliary vacuum line (9) is closed by means of the valve system (11) when it reaches the desired pressure value, such that the main vacuum line (6), which performs the vacuuming process on the other fabric (3) pieces, activates to vacuum at higher pressure and low flow rate.

Figure 3:
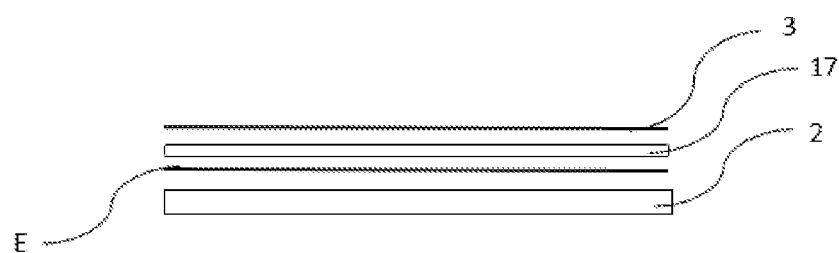
FIG. 3—is a schematic illustration of the composite production system.

In an embodiment of the invention, the composite production system (1) comprises at least one sensor (12) located on the mold (2), which enables the pressure value provided by the main vacuum line (6) and/or the auxiliary vacuum line (9) to be measured; at least one control unit (13) which controls the valve system (11) by the command it transmits, depending on the pressure value determined by the user according to the data received from the sensor (12). The valve system (11), which enables only one of the main vacuum line (6) or the auxiliary vacuum line (9) to be fed by the discharge line (8) depending on the pressure value, opens one of them and closes the other with the command received through the control unit (13). Thus, work load of the main vacuum line (13) can be minimized (FIG. 3).

In an embodiment of the invention, the composite production system (1) comprises a chamber (14) located on the discharge line (8); at least one auxiliary vacuum unit (15) located in the chamber (14) and consisting of the valve system (11), the auxiliary vacuum line (9) and the second vacuum pump (10), wherein the chamber (14) allows the main vacuum line (6) to be located removably on the chamber (14) and thus allows pre-vacuuming to be carried out in a portable manner. It comprises the auxiliary vacuum unit (15), which is portable in the chamber (14) to provide vacuuming of the air inside the vacuum bag (4) before the main vacuum line (6) operates for said fabric (3). Therefore, it comprises an auxiliary vacuum unit (15) that enables the fabric (3) to be vacuumed without limitation of volume, shape or size.

In an embodiment of the invention, the composite production system (1) comprises the valve system (11), which is connected to the auxiliary vacuum line (9) at one end and to the main vacuum line (6) at the other end, thus enabling evacuation of the air over a single discharge line (8). Gradual vacuuming is provided over a single line by means of the evacuation line (8) connected to the vacuum bag (4) at a single point.

In an embodiment of the invention, the composite production system (1) comprises the auxiliary vacuum line (9) removably attached to the discharge line (8) via the valve system (11). The auxiliary vacuum line (9) can be attached to the discharge line (8) from the outside, such that it is removed when the desired pressure value is reached.

In an embodiment of the invention, the composite production system (1) comprises the auxiliary vacuum line (9) triggered by either electric or mechanical motor. Since the auxiliary vacuum line (9) evacuates a large volume of air in the vacuum bag (4), it has an engine power that provides trigger process with a lower pressure.

In an embodiment of the invention, the composite production system (1) comprises the valve system (11) which is a solenoid valve or a control valve. The valve system (11) ensures that one of the main vacuum line (6) and/or the auxiliary vacuum line (9) fed by the discharge line (8) is closed when the other is in operation.

In an embodiment of the invention, the composite production system (1) comprises at least one display (16) that allows the pressure data of the main vacuum line (6) and/or the auxiliary vacuum line (9) to be monitored instantly by the user. It comprises at least one display (16) that includes the instant pressure values and the information whether the main vacuum line (6) and/or the auxiliary vacuum line (9) that reaches the pressure value desired by the user is in operation or not.

In an embodiment of the invention, the composite production system (1) comprises a fabric (3) which is a dry fabric or a prepreg.

In an embodiment of the invention, the composite production system (1) comprises at least one protective layer (17) located between the mold (2) and the fabric (3), which substantially prevents the fabric (3) from sticking to the surface of the mold (2) when temperature and/or pressure is applied on the fabric (3). The protective layer (17) provides easy removal of the fabrics (3) from the surface of the mold (2).

In an embodiment of the invention, the composite production system (1) comprises the auxiliary vacuum line (9) for which a pressure value can be adjusted according to the information input by the user to the control unit (13) regarding the dimensions of the fabric (3). Since pressure value is determined automatically, vacuuming is provided without loss of energy.

In an embodiment of the invention, the composite production system (1) comprises the control unit (13) which adjusts power of the first vacuum pump (7) depending on the power consumed by the second vacuum pump (10), and enables the pressure value to remain at an optimum value predetermined by the user. The control unit (13) enables the pressure value determined by the user to remain at the set value.

The invention claimed is:

1. A composite production system (1) comprising:
   a mold (2);
   a plurality of fabrics (3) laid on the mold (2);
   at least one vacuum bag (4) which is placed on the mold (2) so as to substantially cover the plurality of fabrics (3) and to allow vacuuming;
   at least one bleeder (E) located between the mold (2) and/or the plurality of fabrics (3);
   at least one separator layer (5) which is located between the vacuum bag (4) and the plurality of fabric (3) and enables the excess resin in the plurality of fabrics (3) to be substantially absorbed by the bleeder (E), thus providing homogeneous pressure distribution;
   at least one main vacuum line (6) located on the vacuum bag (4), which allows evacuation of the air and/or the resin in the plurality of fabric (3) and/or the air between the vacuum bag (4) and the mold (2);
   a first vacuum pump (7) which is connected to the main vacuum line (6) and generates a pressure required to evacuate the air;
   at least one discharge line (8) located on the vacuum bag (4), with at least one end thereof connected to the main vacuum line (6);
   at least one auxiliary vacuum line (9) with at least one end thereof connected to the at least one discharge line (8), wherein the at least one auxiliary vacuum line (9) creates a lower pressure than the main vacuum line (6) to substantially evacuate the air contained in the vacuum bag (4), thereby enabling the pre-vacuuming process to be performed;
   a second vacuum pump (10) connected to the at least one auxiliary vacuum line (9) and providing the necessary pressure to evacuate the air; and
   at least one valve system (11) located on the at least one discharge line (8), which allows only one of the main vacuum line (6) or the at least one auxiliary vacuum line (9) to be fed by the at least one discharge line (8) in order to keep a pressure value of the main vacuum line (6) and/or the at least one auxiliary vacuum line (9) at a pressure value determined by a user.

2. The composite production system (1) according to claim 1, comprising:
   at least one sensor (12) located on the mold (2), which enables the pressure value provided by the main vacuum line (6) and/or the at least one auxiliary vacuum line (9) to be measured; and
   at least one control unit (13) which controls the valve system (11) by the command it transmits, depending on the pressure value determined by the user according to the data received from the sensor (12).

3. The composite production system (1) according to claim 1, comprising:
   at least one chamber (14) located on the at least one discharge line (8); and
   at least one auxiliary vacuum unit (15) located in the chamber (14) and consisting of the valve system (11), the at least one auxiliary vacuum line (9) and the second vacuum pump (10), wherein the chamber (14) allows the main vacuum line (6) to be located removably on the chamber (14) and thus allows pre-vacuuming to be carried out in a portable manner.

4. The composite production system (1) according to claim 1, wherein the valve system (11) is connected to the at least one auxiliary vacuum line (9) at one end thereof and to the main vacuum line (6) at the other end thereof, thus enabling evacuation of the air over a single one of the at least one discharge line (8).

5. The composite production system (1) according to claim 1, wherein the at least one auxiliary vacuum line (9) is removably attached to the at least one discharge line (8) via the valve system (11).

6. The composite production system (1) according to claim 1, wherein the at least one auxiliary vacuum line (9) is triggered by either an electric motor or a mechanical motor.

7. The composite production system (1) according to claim 1, wherein the valve system (11) is a solenoid valve or a control valve.

8. The composite production system (1) according to claim 1, wherein at least one display (16) allows the pressure data of the main vacuum line (6) and/or the at least one auxiliary vacuum line (9) to be monitored instantly by the user.

9. The composite production system (1) according to claim 1, wherein at least one of the plurality of fabrics (3) is a dry fabric or a prepreg.

10. The composite production system (1) according to claim 1, comprising at least one protective layer (17) located between the mold (2) and the fabric (3), which substantially prevents the plurality of fabrics (3) from sticking to the surface of the mold (2) when temperature and/or pressure is applied on the plurality of fabrics (3).

11. The composite production system (1) according to claim 2, wherein the pressure value of the at least one auxiliary vacuum line (9) can be adjusted according to information input by the user to the control unit (13) regarding dimensions of the plurality of fabrics (3).

12. The composite production system (1) according to claim 2, wherein the control unit (13) adjusts power of the first vacuum pump (7) depending on power consumed by the second vacuum pump (10), and enables the pressure value to remain at a value predetermined by the user.

* * * * *